United States Patent
Park et al.

(10) Patent No.: US 11,289,986 B2
(45) Date of Patent: Mar. 29, 2022

(54) MOTOR FOR AIR COMPRESSOR

(71) Applicants: Hyundai Motor Company, Seoul (KR); KIA Motors Corporation, Seoul (KR)

(72) Inventors: Jeong Hee Park, Suwon-si (KR); Jong Myeong Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 94 days.

(21) Appl. No.: 16/860,547

(22) Filed: Apr. 28, 2020

(65) Prior Publication Data

US 2021/0135555 A1   May 6, 2021

(30) Foreign Application Priority Data

Nov. 6, 2019   (KR) .......................... 10-2019-0141279

(51) Int. Cl.
*H02K 21/02*   (2006.01)
*H02K 21/20*   (2006.01)

(52) U.S. Cl.
CPC ........... *H02K 21/029* (2013.01); *H02K 21/20* (2013.01)

(58) Field of Classification Search
CPC ............................ H02K 21/029; H02K 21/20
See application file for complete search history.

(56) References Cited

U.S. PATENT DOCUMENTS

2020/0244127 A1*   7/2020   Birkmayer ............. H02K 11/33

* cited by examiner

*Primary Examiner* — Ramon M Barrera
(74) *Attorney, Agent, or Firm* — McDonnell Boehnen Hulbert & Berghoff LLP

(57) ABSTRACT

A motor for an air compressor is provided. The motor includes a stator including a first coil to generate a magnetic flux for driving the motor and a second coil positioned in a space the same as a space for the first coil to increase an inductance, and a rotator to mutually interact with the stator to rotate.

3 Claims, 4 Drawing Sheets

⊙ ⊗ : WINDING METHOD OF FIRST COIL
⊙ ⊗ : WINDING METHOD OF SECOND COIL
⟵ : FIRST MAGNETIC FLUX
← : SECOND MAGNETIC FLUX

[PRIOR ART]

[PRESENT DISCLOSURE]

MOTOR FOR AIR COMPRESSOR

CROSS-REFERENCE TO RELATED APPLICATIONS

This application claims the benefit of priority to Korean Patent Application No. 10-2019-0141279, filed in the Korean Intellectual Property Office on Nov. 6, 2019, the entire contents of which are incorporated herein by reference.

TECHNICAL FIELD

The present disclosure relates to a motor for an air compressor.

BACKGROUND

Fuel cell systems applied to environmentally friendly vehicles provide electricity, which is produced by the chemical reaction of hydrogen and air, as a driving force. The fuel cell system includes an Air Processing System (APS) to supply external air to a fuel cell stack. The APS includes air filters, air compressors, humidifiers, and air blockers. Among them, the air compressor has the largest volume among the various components that drive fuel cells, which causes higher constraint in volume. Therefore, conventionally, a high speed motor of 90 krpm or more has been applied to the air compressor to reduce the air compressor volume, and thus, a low inductance is made on the high speed motor.

Conventionally, the air compressor having the high speed motor directly uses power from the fuel cell stack as input power, which causes voltage limiting. Accordingly, the inductance is designed to have a low value in the range from tens of µHs to hundreds of µHs. However, the low inductance raises the peak current by the inverter switching to increase the ripple of the current input into the motor. The increasing in the ripple of the current increases losses, which makes a difficulty in cooling designing of the motor and the inverter. To solve such a conventional problem, the inductance may be increased by using a coil necessary to drive a motor, but the characteristics of the motor may be changed.

Alternatively, an external inductor (coil) may be provided between the inverter and the motor to increase the inductance without changing the characteristics of the motor. However, when an external inductor may be provided, a cooling device to cool heat generated from the external inductor is additionally necessary, which increases costs.

SUMMARY

The present disclosure has been made to solve the above-mentioned problems occurring in the prior art while advantages achieved by the prior art are maintained intact.

An aspect of the present disclosure provides a motor for an air compressor to increase the inductance by adding a coil inside the motor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a motor for an air compressor includes a stator including a first coil to generate a magnetic flux for driving the motor and a second coil positioned in a space the same as a space for the first coil to increase an inductance, and a rotator to mutually interact with the stator to rotate.

The second coil is additionally wound to be overlapped with the first coil wound around the stator.

The second coil includes three pairs of coils having mutually different phases.

Each of the three pairs of coils includes two coils disposed to face each other.

The two coils are wound in directions opposite to each other to cancel magnetic fluxes generated to face each other.

The rotator includes an N pole permanent magnet and an S pole permanent magnet which are attached to a surface thereof.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
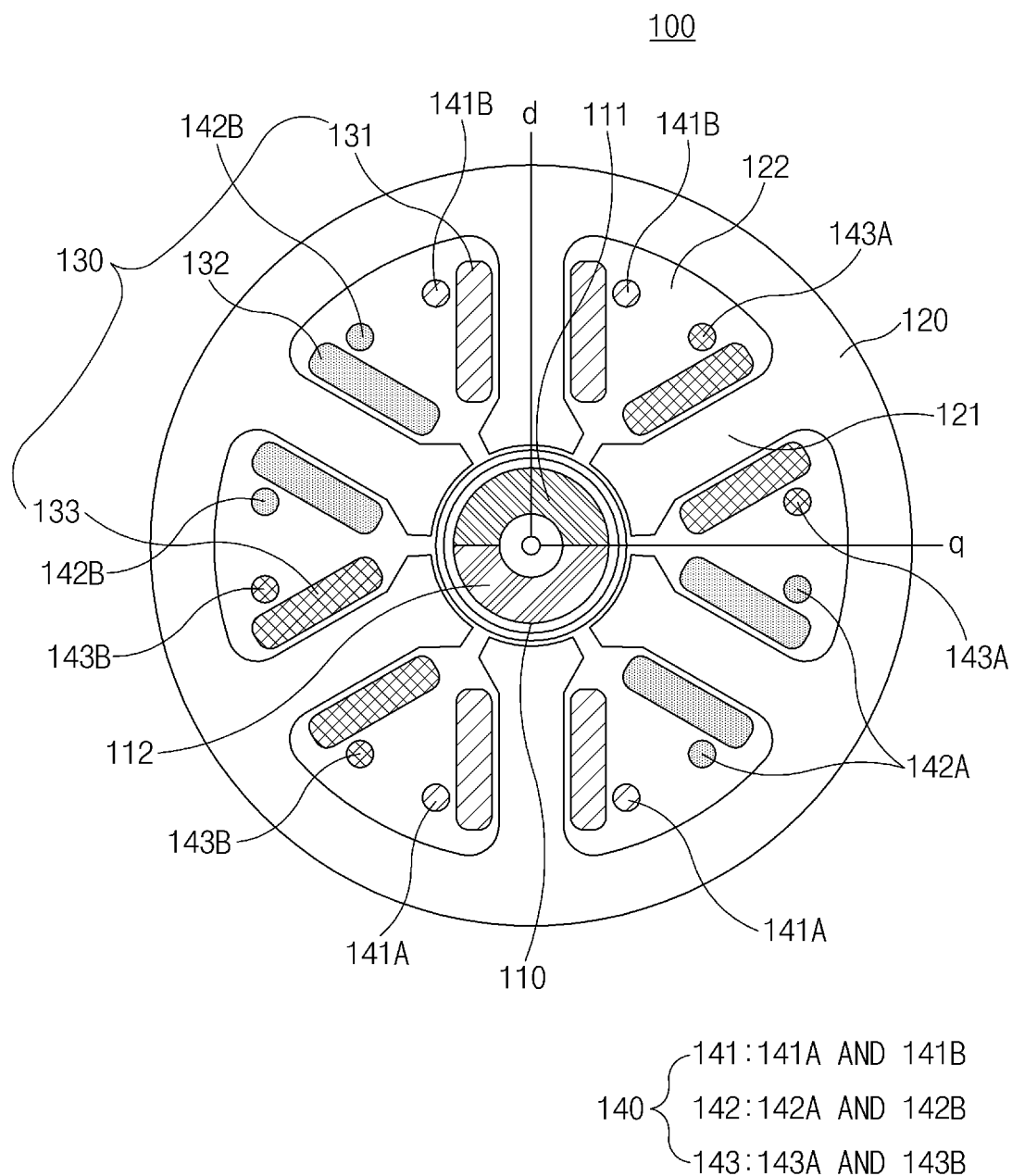
FIG. 1 is a view schematically illustrating a motor, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to a motor (high speed motor) to drive an air compressor in an air processing system (APS) of a fuel cell vehicle, and suggests a method for increasing inductance without changing the characteristics of the motor.

In general, an air compressor should be manufactured as small as possible to be applied to the APS application. The size of the air compressor is greatly influenced by the size of a motor, and the size of the motor is proportional to a motor torque. Accordingly, when the air compressor is designed, the motor speed should be increased as much as possible while the motor torque should be small as much as possible.

Since a cell voltage decreases when the output of the fuel cell stack increases, the output and the speed of the air compressor are determined in consideration of the maximum flow rate corresponding to the maximum output of the fuel cell stack when the air compressor is designed. In other words, the maximum speed is made when the maximum flow rate is necessary. In this case, even the driving voltage of the air compressor is minimized. For example, on the assumption that the voltage is 200 V at the maximum output of the fuel cell stack, the air compressor should satisfy the maximum speed and the maximum output (=torque×speed) at the voltage of 200 V.

When the motor is designed in consideration of the characteristics of the fuel cell stack and the air compressor, many constrains may be present. Parameters defining motor characteristics include a resistance (R), an inductance (L), a back electromotive force (BackEMF), a torque (T), a rotational speed (ω), and input voltage (V).

The motor characteristics may be expressed as in the following Equation 1 and Equation 2. To characterize the motor, the voltage V, inductance L and current i generated in the motor are separated by a d-q axis of the rotational coordinate system. The d axis is an axis in which magnetic flux of the motor is generated, and the q axis is an axis orthogonal to the d axis.

$$V_d = (R_a + pL_d)i_d + (-\omega L_q)i_q \quad \text{Equation 1}$$

$$V_q = (\omega L_d)i_d + (R_a + pL_q)i_q + \omega \phi_a \quad \text{Equation 2}$$

In this case, $V_d$ is a d-axis voltage, $V_q$ refers to a q-axis voltage, $L_d$ refers to a d-axis inductance, $L_q$ refers to a q-axis inductance, $i_d$ refers to d-axis current, $i_q$ refers to q-axis current, $R_a$ refers to a winding resistance, $\phi_a$ is back electromotive force generated from the magnetic flux. $L_d$ and $L_q$ have equal values when Surface Permanent Magnet (SPM) is used. The resistance $R_a$ is determined by the length of the winding (coil), and the inductance L is determined by the number of turns windings (coils) on the stator. When the input voltage V of the motor is higher than the root value ($\sqrt{V_d^2 + V_q^2}$) of the sum of the square of $V_d$ and the square of $V_q$, the motor normally operates. To manufacture the motor in small size under the condition that the input voltage of the motor is small, each parameter should be designed as small as possible. Among them, the inductance should be designed as small as possible. However, when the inductance is designed to be small, the small inductance increases the ripple of a current input to the motor to increase loss, which causes a cooling problem in the motor and the inverter. Therefore, to solve the problem caused by a small inductance, the present disclosure suggests a motor having an inductance increased by additionally providing a coil inside the motor without the influence on the characteristic of the motor. The inductance in the motor is a parameter to generate the magnetic flux by the current input to the motor. Accordingly, the larger inductance may generate the larger magnetic flux even in the case of a small input current. The inductance of the inverter is intended to prevent the change of the current when the current flows in a conduct line (coil). The larger inductance may reduce the peak current by the inverter switching, thereby reducing the current ripple.

Figure 2:
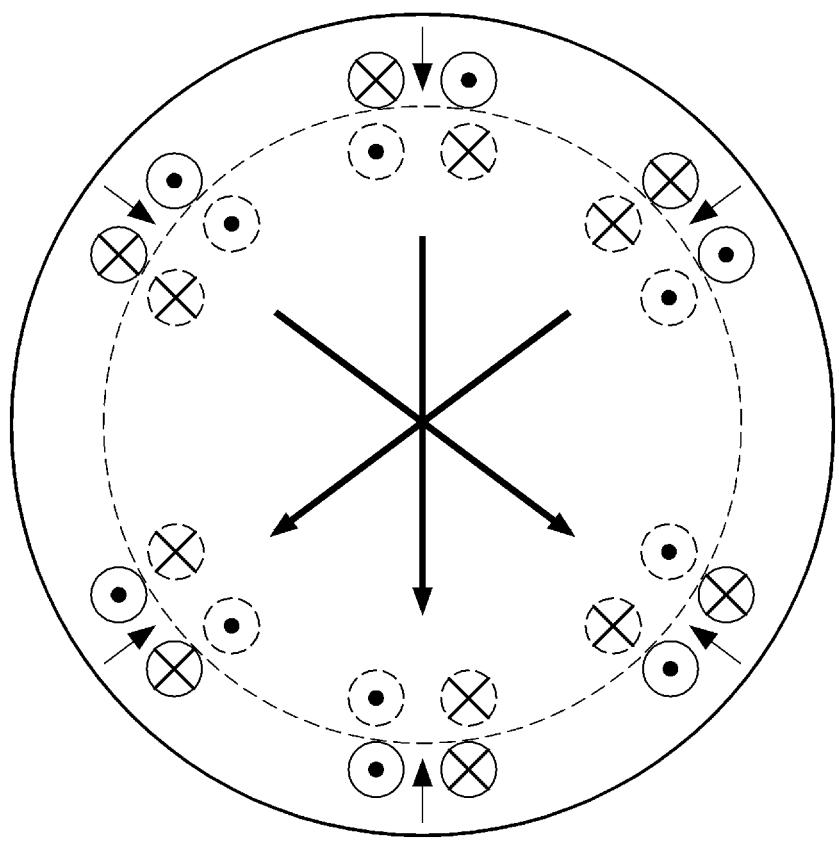
FIG. 2 is a view illustrating a method for winding a second coil in a motor, according to an embodiment of the present disclosure.

FIG. 1 is a view schematically illustrating a motor, according to an embodiment of the present disclosure, and FIG. 2 is a view illustrating a method for winding a second coil in a motor, according to an embodiment of the present disclosure. The following description will be made, according to the present embodiment, regarding a surface permanent motor (SPM) motor in which a permanent magnet is attached to the surface of a rotor.

Referring to FIG. 1, a motor 100 includes a rotor 110 and a stator 120.

The rotor 110 includes an N Pole permanent magnet 111 and an S Pole permanent magnet 112 which are attached to the surface thereof. The rotor 110 is rotatably disposed with a predetermined distance, that is, an air gap, from the stator 120. The rotor 110 rotates through interaction with the stator 120. In this case, the rotor 110 rotates about a shaft which is a driving axis.

The stator 120 is disposed outside the rotor 110 and is fixedly disposed inside a motor housing. The stator 120 includes a plurality of teeth 121 that protrude radially while being spaced apart from each other by a specific distance in the circumferential direction of a body. A slot 122 is formed between the teeth 121. The slot 122 is a space where a coil wound around the teeth 121 is position.

A first coil 130 and a second coil 140 are wound on the teeth 121. The first coil 130 includes a first coil 131 having a first phase (U phase), a first coil 132 having a second phase (V phase), and a first coil 133 having a third phase (W phase). When the current is input from the inverter (not illustrated), the first coil 130 generates a first magnetic flux for driving the motor. The direction of the first magnetic flux, which is generated in the winding direction of the first coil 130 according to the right hand rule of Fleming, is as illustrated in FIG. 2. The rotor 110 rotates as the first magnetic flux generated by the stator 120 interacts with the magnetic forces of the N Pole permanent magnet 111 and the S Pole permanent magnet 112.

The second coil 140, which is a coil (additional coil) added to increase the inductance, is disposed to be overlapped with the first coil 130. The second coil 140 is positioned in the same slot 122 as that of the first coil 130. The second coil 140 may include three pairs of coils having mutually different phases and may include, that is, a pair of second coils 141A and 141B having the first phase, a pair of second coils 142A and 142B having the second phase, and a pair of second coils 143A and 143B having the third phase. The pair of second coils 141A and 141B, which are in phase, are disposed to face each other, the pair of second coils 142A and 142B, which are in phase, are disposed to face each other, and the pair of second coils 143A and 143B, which are in phase, are disposed to face each other.

To increase the inductance of the motor 100, the number of turns of the second coil 140 is increased. In this case, the number of turns of the second coil 140 may be determined by the size of the slot 122. The pair of the second coils 141A and 141B, which are in phase to face each other, are wound in directions (winding directions) opposite to each other to cancel second magnetic fluxes generated from the pair of the second coils 141A and 141B having the first phase. The pair of second coils 142A and 142B, which are in phase to face each other, are wound in winding directions opposite to each other to cancel second magnetic fluxes generated from the pair of the second coils 142A and 142B having the second phase. The pair of second coils 143A and 143B in phase to face each other, are wound in winding directions opposite to each other to cancel second magnetic fluxes generated from the pair of the second coils 143A and 143B having the third phase. In other words, the winding directions of a pair of the second coils 141A and 141B, 142A and 142B, or 143A and 143B having the relevant phase are opposite to each other.

In more detail, as illustrated in FIG. 1, the second coil 140 to increase the inductance is further wound around the stator 120. The method for winding the second coil 140 is to wind the second coils, which are positioned symmetrically to each other, in directions opposite to each other as illustrated in FIG. 2. In this case, '⊙' refers to winding the second coil 140 upward in the slot 122, and '⊗' refers to winding in the direction of inputting the second coil 140 downward in the slot 122. As described above, the second magnetic fluxes are generated in opposition to each other by the second coil 140 and cancelled from each other, which is not exerted on the operation of the motor.

As described above, the first coil 130 necessary to drive the motor and the second coil 140 necessary to increase inductance are provided in the same slot 122. Accordingly, the heat generated from the second coil 140 may be cooled by using the existing motor cooling device. As described above, the existing motor cooling device may be used in common, so an advantageous effect is produced the layout of the vehicle.

Figure 3:
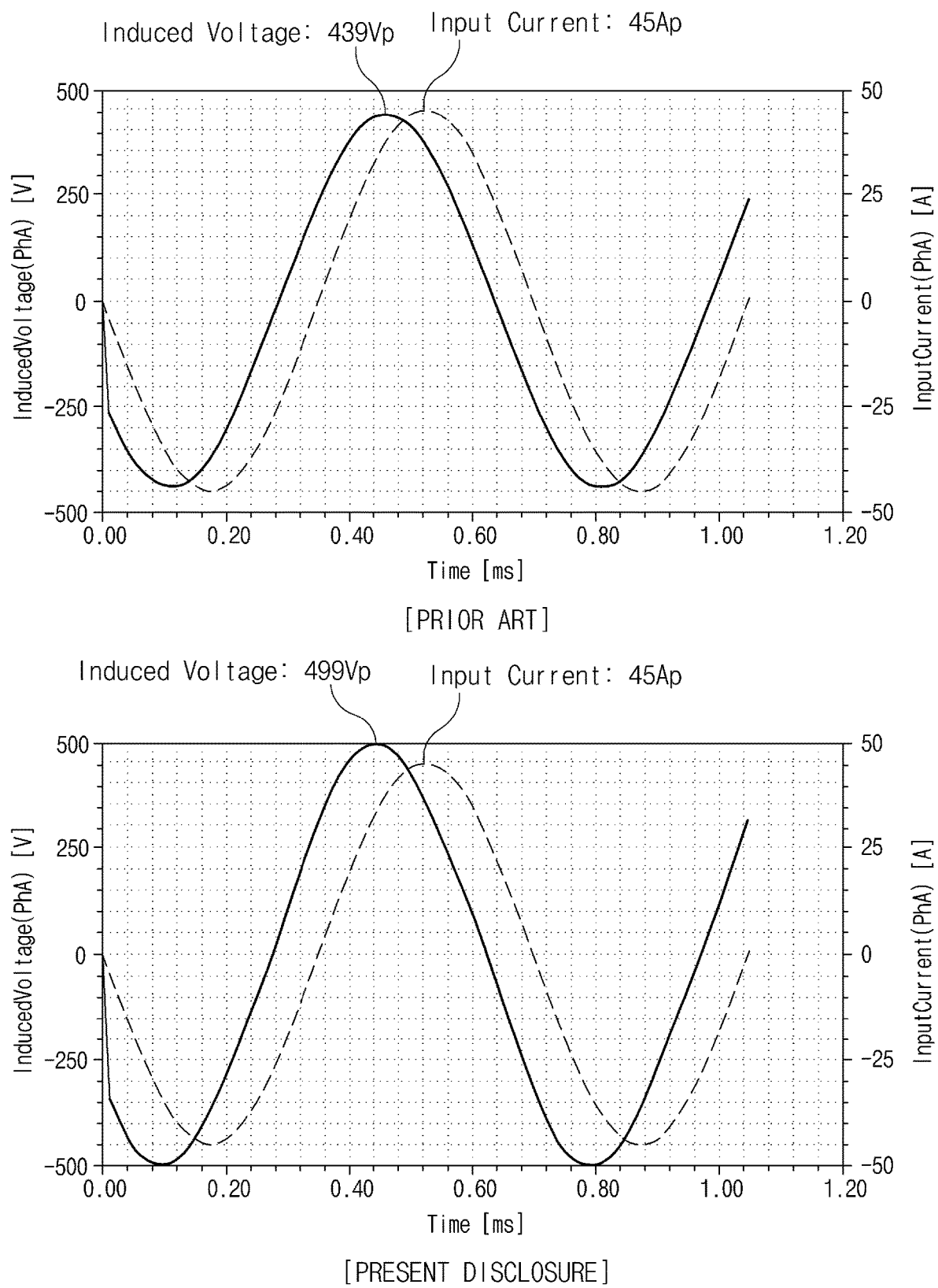
FIG. 3 is a graphical view illustrating the performance of a motor, according to an embodiment of the present disclosure.
Figure 4:
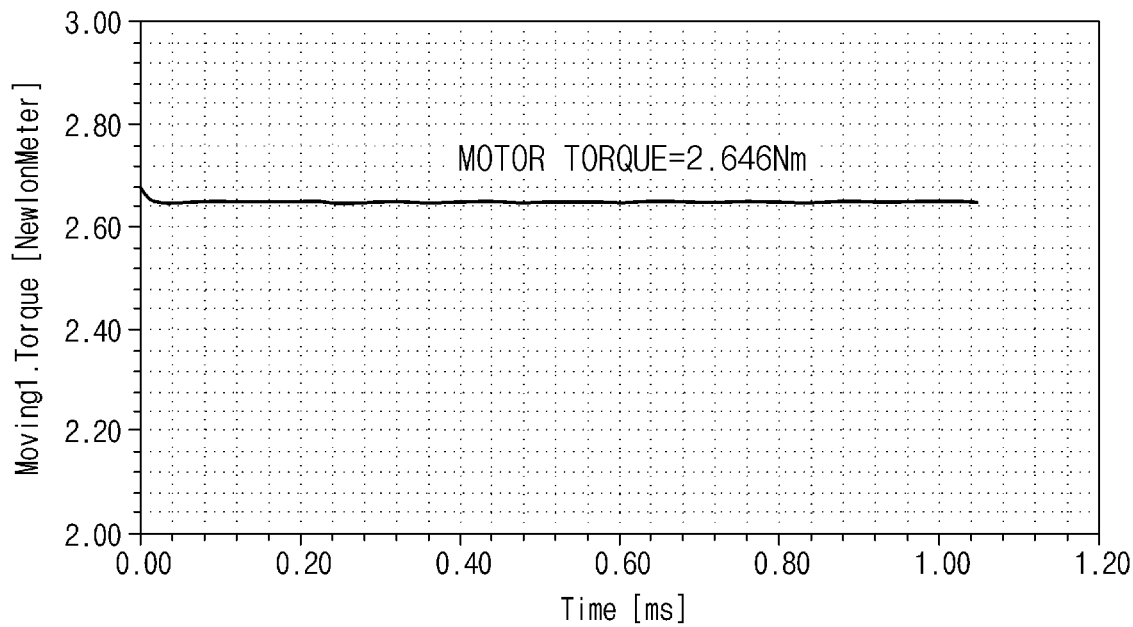
FIG. 4 is another graphical view illustrating the performance of a motor, according to an embodiment of the present disclosure.
Figure 4:
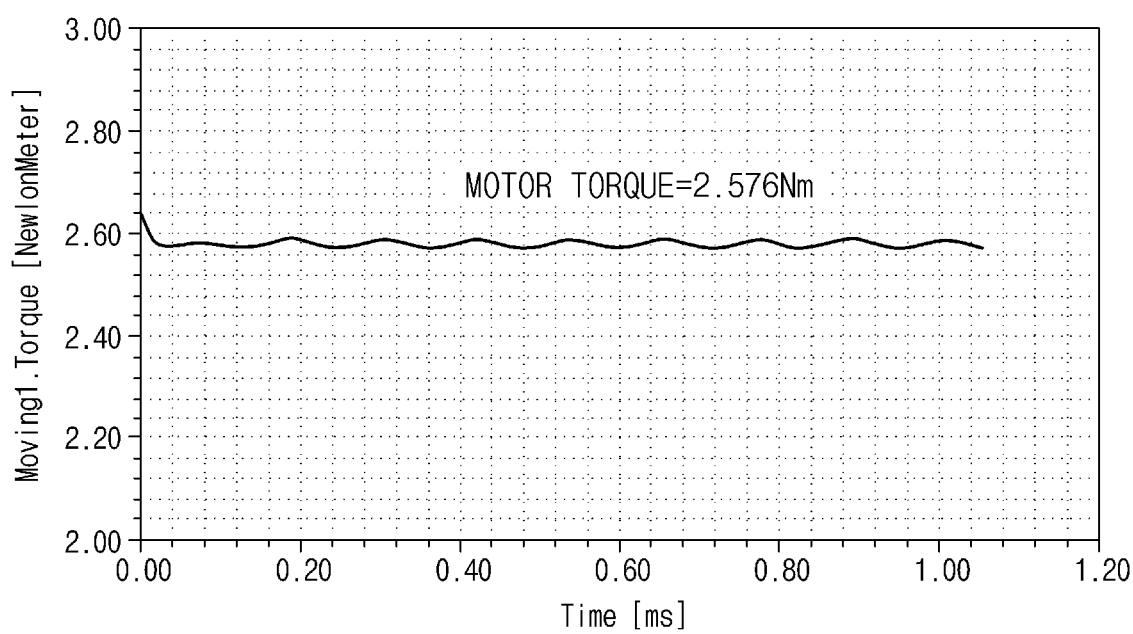

FIGS. 3 and 4 are graphical views illustrating the performance of the motor, according to an embodiment of the present disclosure.

Referring to FIG. 3, when the same input current is supplied to the motor 100 according to the present disclosure and a conventional motor, an induced voltage is increased in the motor 100 according to the present disclosure more than the conventional motor. In other words, the induced voltage is increased in the motor 100 according to the present disclosure, as the inductance is increased by the second coil 140.

Referring to FIG. 4, according to the present disclosure, the motor 100 outputs a torque similar to that of the conventional motor at the same speed. The output of the motor (=speed×torque) is defined as the speed and torque of the motor. Referring to FIG. 4, according to the present disclosure, the motor 100 has no difference in performance with the conventional motor.

As described above, although the inductance is increased by the second coil 140 as the second coil 140 is added inside the motor 100, any influence is not exerted on the driving (characteristic) of the motor 100. As the inductance is increased by the second coil 140, the ripple of the current input to the motor 100 may be reduced, thereby improving the efficiency of the air compressor.

As described above, according to the present disclosure, when adding a coil to increase the inductance inside the motor, mutually facing coils are provided in directions opposite to each other, thereby maintaining the motor characteristic.

In addition, according to the present disclosure, the coil necessary to drive the motor and the coil necessary to increase the inductance are provided inside the motor. In this case, an existing motor cooling device may be used in common without an additional cooing device to cool down the heat generated from the coil necessary to increase the inductance.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A motor for an air compressor, the motor comprising:
a stator including a first coil to generate a magnetic flux for driving the motor and a second coil positioned in a space the same as a space for the first coil to increase an inductance; and
a rotator to mutually interact with the stator to rotate,
wherein the second coil includes three pairs of coils having mutually different phases,
wherein each of the three pair of coils includes two coils disposed to face each other, and
wherein the two coils are wound in directions opposite to each other to cancel magnetic fluxes generated to face each other.

2. The motor of claim 1, wherein the second coil is additionally wound to be overlapped with the first coil wound around the stator.

3. The motor of claim 1, wherein the rotator includes an N pole permanent magnet and an S pole permanent magnet which are attached to a surface of the rotator.

* * * * *